May 2, 1967 PER O. WEMAN 3,317,243
SAFETY BELTS
Filed May 20, 1965 3 Sheets-Sheet 1
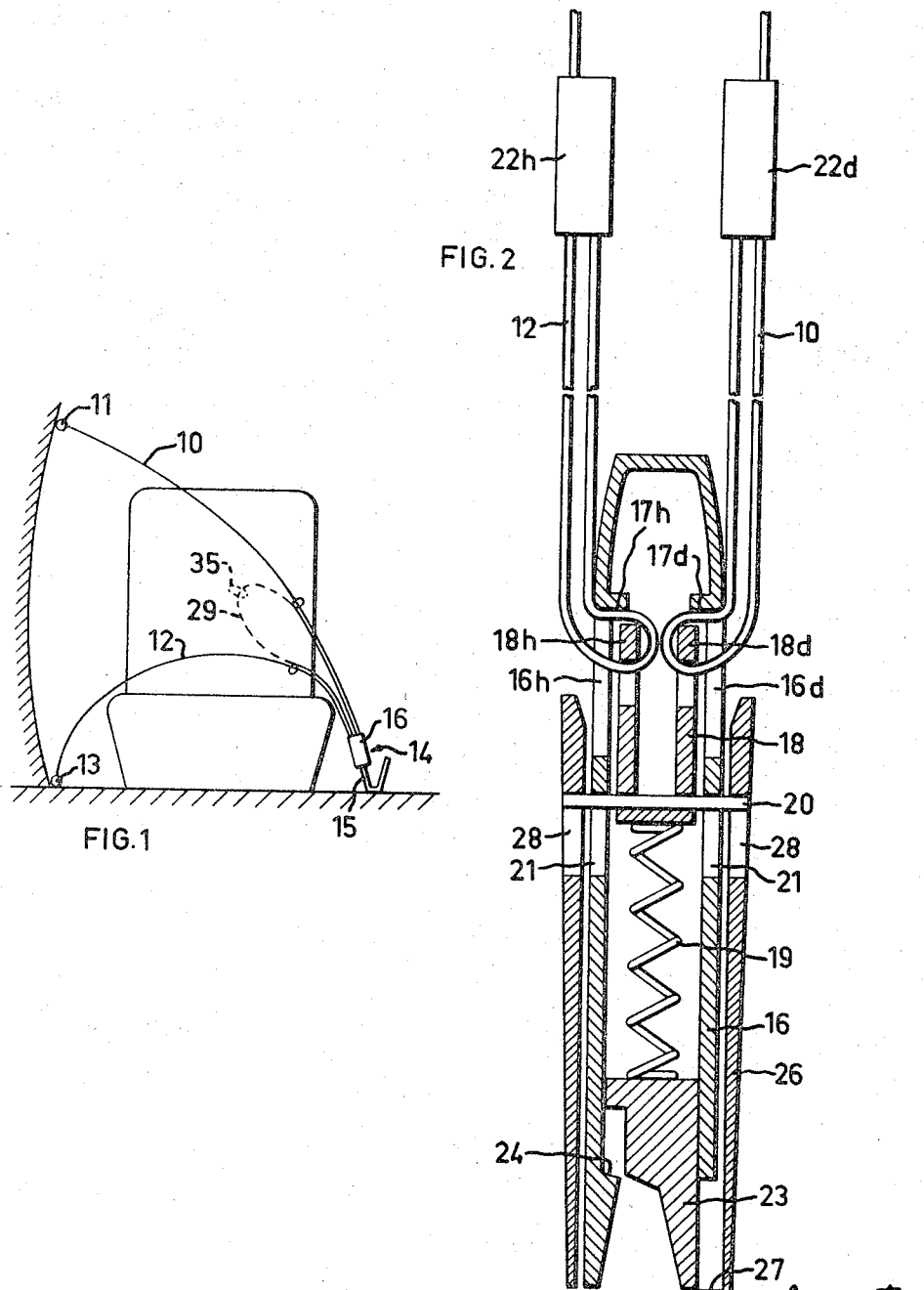

May 2, 1967 PER O. WEMAN 3,317,243
SAFETY BELTS
Filed May 20, 1965 3 Sheets-Sheet 2
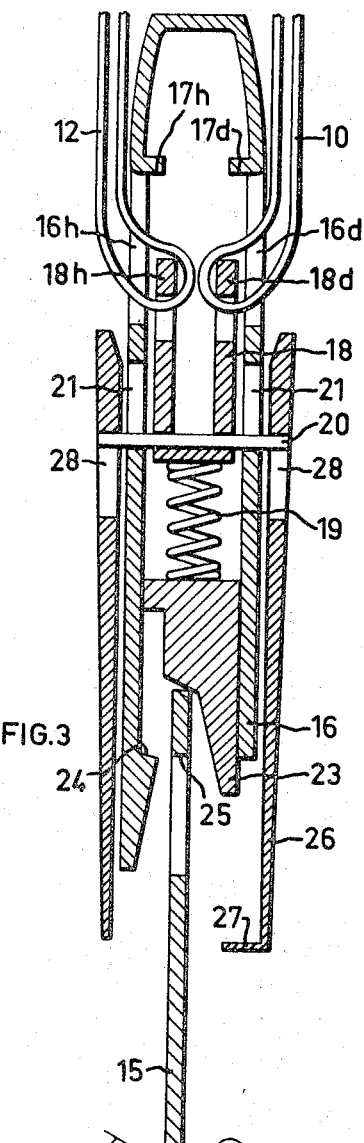
FIG. 3
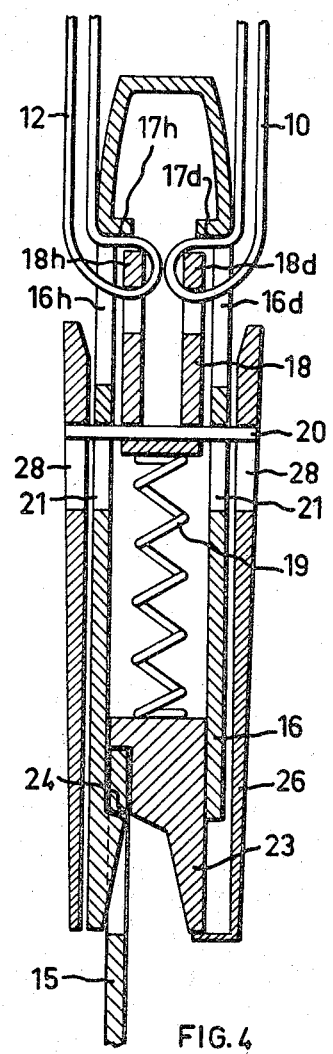
FIG. 4
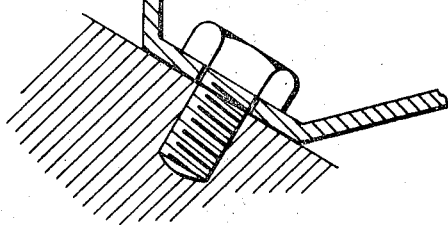
Inventor
Per O. Weman
By
Karl W. Flocks
Attorney May 2, 1967  PER O. WEMAN  3,317,243
SAFETY BELTS
Filed May 20, 1965  3 Sheets-Sheet 3
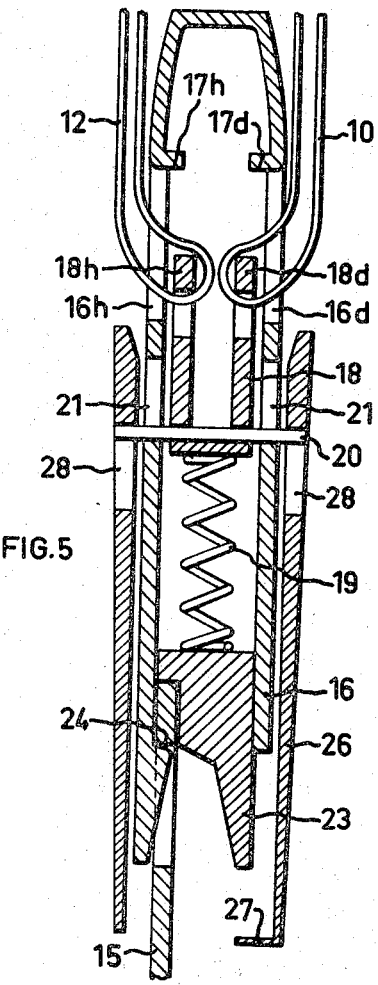
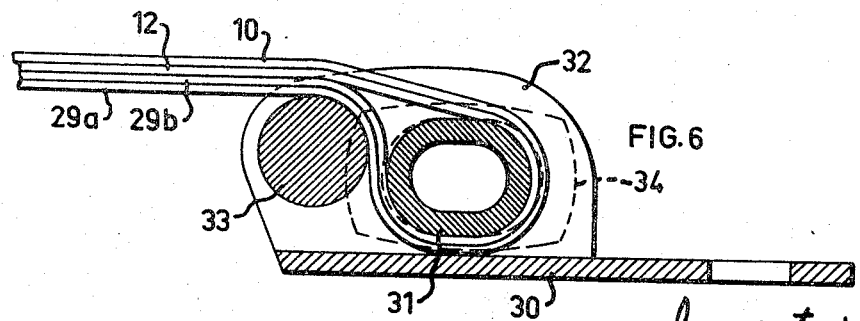
Inventor
Per O. Weman
By
Karl W. Flocks
attorney

United States Patent Office 3,317,243
Patented May 2, 1967

3,317,243
SAFETY BELTS
Per O. Weman, Hamburg-Garstedt, Germany, assignor to Sigmatex A.G., Basel, Switzerland, a corporation of Switzerland
Filed May 20, 1965, Ser. No. 457,419
Claims priority, application Sweden, May 21, 1964, 6,151/64
11 Claims. (Cl. 297—389)

This invention relates to safety belts particularly for the occupants of motor vehicles and more exactly to three-point safety belts having chest and hip straps which have their one ends anchored on one side of a seat at shoulder level and beneath the seat, respectively, and are detachably connected by a common buckle to an anchorage point on the other side of the seat.

A safety belt for the occupants of motor vehicles should not only retain the occupant to the seat and be so constructed that in the event of a collision it does not exert forces that may cause serious injuries to the seat occupant, but should also permit adaptation to a great variety of people so that it may correctly fulfill its vital function in each particular case. In addition, the safety belt should be easy and convenient in use so that it is actually employed also at short trips and at low speeds, and it must not hinder the movements required for manoeuvring the motor vehicle. The three-point type safety belts as now in use for the occupants of motor vehicles well fulfill the requirement for an efficient function, while many people consider the adjustment of the safety belt difficult to perform, for which reason such adjustment is neglected at the fastening of the safety belt and the seat occupant therefore is not always retained in his seat in the manner necessary for a correct function of the safety belt.

For the adjustment of the safety belt it was earlier suggested to allow the chest and hip straps to run freely through the buckle as a continuous loop so that there may occur, at the fastening of the belt, a certain equalization in length between the two straps. The length of the two straps can thus be adapted to the seat occupant in that either strap is adjusted in the associated anchorage point on said one side of the seat; in other words it is not necessary to arrange for an adjustment at both anchorage points on that side, as is the case when the two straps are individually secured in the buckle or a continuous loop formed by the straps is secured in the buckle, so that an increase of the length of one strap at the cost of that of the other strap cannot take place. Although a continuous loop freely extending through the buckle favourably facilitates the correct adjustment of the safety belt, it is disadvantageous to the function of the belt in the event of a collision. To avoid the so-called sling-shot effect which consists in that having moved forwardly with his upper body at the actual moment of collision under controlled braking of the movement by the chest strap which is thereby elongated, the seat occupant is abruptly pulled back against the seat due to the elasticity of the belt straps, whereby the seat occupant might break his neck and tear his arteries, it is necessary that the chest strap be imparted a certain remaining elongation at the moment of collision, which however, must naturally be restricted to such an extent that the seat occupant is not moved altogether up to the windshield at the moment of collision; the chest strap shall, as one puts it, have a certain hysteresis at dynamic load. When the chest and hip straps run freely through the buckle it may now at such collisions in which the vehicle is subjected to more than one shock, occur that the elongation of the chest strap that is brought about at the primary collision shock, is forwarded to the hip strap so that the seat occupant is shifted into another position in the seat and the elongated hip strap perhaps will come to lie across the stomach of the seat occupant. This effect which is well-known within the art and is termed "submarining" may at a renewed heavy load on the hip strap, caused by a secondary collision shock, have catastrophic consequences through injuries to the sensitive internal organs in the stomach.

The invention has for its object to provide a three-point safety belt for the occupants of motor vehicles and particularly one of a type which will facilitate the adaptation of the belt to the seat occupant without thereby impairing the function of the belt, simultaneously as the seat occupant by a single motion can temporarily acquire additional freedom of motion, when this is desired, without the necessity of taking off the safety belt. This is realized in the safety belt of the type outlined in the foregoing in that the two straps run separately through one part of the buckle and are passed about a transversely movable bar in said buckle part for clamping the respective strap immovably against an abutment in the buckle part at a pull at the respective strap.

These and further important features of the invention and the advantages gained thereby will appear from the following description in which reference is made to the accompanying drawings in which:

FIG. 1 is a diagrammatic view of a three-point safety belt for the occupants of motor vehicles, which is arranged in connection with a seat;

FIG. 2 is a longitudinal section, on a larger scale, showing one part of the buckle of the safety belt when said buckle part is separated from the locking tongue forming the other buckle part and arranged for co-operation with said one buckle part, and is not actuated manually, as well as portions of the straps secured in said one buckle part;

FIG. 3 is a longitudinal section similar to FIG. 2 of the buckle when said one buckle part is moved into engagement with the locking tongue;

FIG. 4 is a longitudinal section similar to FIG. 2 of the buckle when the buckle parts are engaged with each other;

FIG. 5 is a longitudinal section similar to FIG. 2 of said one buckle part when it is actuated for releasing the straps secured therein;

FIG. 6 is a side elevation of a locking tongue for a buckle for safety belts in which the straps are secured in a simplified manner.

According to FIG. 1, a three-point safety belt comprises a chest strap 10 which is anchored in the vehicle body on one side of the seat rearwardly thereof at shoulder level at an anchorage point 11, and a hip strip 12 which is also anchored in the vehicle body on said one side of the seat but beneath it at an anchorage point 13, while the two straps are detachably anchored in the vehicle body on the other side of and beneath the seat by means of a buckle 14 common to both the straps and including a buckle body 16 which co-acts with a locking tongue 15 which is here shown fixed to the floor of the vehicle body but may also in a known manner be connected to the floor of the vehicle body by means of a third strap which via the buckle constitutes a continuation of both the chest strap and the hip strap. So far the three-point safety belt shown is of conventional conception.

As shown in FIGS. 2–5, the buckle body 16 is formed at one end with two abutments 17d and 17h. Two strap-receiving portions 18d and 18h comprised in a U-shaped bar 18 are adapted to co-operate each with one of the abutments for clamping the chest strap 10 and the hip strap 12, respectively, in the buckle body 16 in that the bar 18 is movably guided in the buckle body for movement towards and away from the abutments. The bar is biased towards the abutments by a pressure spring 19 and its movements in the buckle body are restricted by a pin 20 passing through the bar and having the opposite ends projecting from the buckle body through slots 21 therein. The chest strap 10 is inserted in the buckle body through an opening 16d therein and is passed about the strap-receiving portion 18d and again extends out of the buckle body between said portion and the abutment 17a co-acting therewith, the strap being normally held clamped between said strap-receiving portion and said abutment by the action of the pressure spring 19 and this clamping action is further enhanced when a pull is exerted in the chest strap 10 between the anchorage point 11 and the buckle 14 since the strap-receiving portion is thereby pressed against the abutment. The free end of the chest strap 10 projecting from the buckle body terminates in a clasp 22d secured to said free end and movably guided on the chest strap between the anchorage point 11 and the buckle 14. In the same way the hip strap 12 is inserted in the buckle body through an opening 16h and is passed about the strap-receiving portion 18h to be clamped between said portion and the abutment 17h and is provided with a clasp 22h which is movably guided on the hip strap between the anchorage point 13 and the buckle 14.

The pressure spring 19 is interposed between the bar 18 and a latch member 23 which is also movably guided in the buckle body 16 and comprised in a locking mechanism at the other end of the buckle. Said locking mechanism comprises a shoulder 24 formed by a boss in the buckle body and adapted to co-act with an edge surface 25 of an opening in the locking tongue 15 when the latter is engaged with the buckle body. The latch member 23 is urged by the pressure spring 19 towards said other end of the buckle body, the lower one in FIGS. 2-5, into a latching position (FIG. 4) which is defined by stop means (not shown) and in which the latch member prevents the locking tongue 15 from moving up over the shoulder 24. The latch member 23 is so shaped as to be easily moved away by the locking tongue 15 upon insertion thereof in the buckle body 16 against the action of the spring 19 in order to snap, when the buckle body and the locking tongue have been engaged with each other, into latching position (FIG. 4) by the action of the pressure spring 19. This locking mechanism is of a type well known per se and, without departing from the scope of the invention, it may be replaced by a locking mechanism of another type, if desired. The lach member 23 is manually actuable by means of a sleeve 26 which is disposed on the outer side of the buckle body 16 and which is easily grasped with the hand and is movable longitudinally of the buckle body between the secured strap end and the end of the locking mechanism. The sleeve 26 has an angularly bent end portion 27, which takes the latch member 23 along in the movement of the sleeve when the latter is moved towards the secured strap end, the upper end in FIGS. 2-5, for releasing the buckle body from the locking tongue 15 inasmuch as the locking tongue and the buckle body after retraction of the latch member 23 against the action of the spring 19 can freely move out of mutual engagement. The latch member 23, however, can be freely pressed back by the locking tongue 15 upon insertion thereof in the buckle body without being impeded by the angularly bent portion 27, FIG. 3.

The sleeve 26 also serves to operate the movement of the bar 18. For this purpose, there is arranged between said bar and said sleeve 26 a lost motion connection of the pin and slot type in that the ends of the pin 20 projecting on either side of the buckle body 16 are engaged in slots 28 in the sleeve 26. When the sleeve is not manually acted upon the pin 20 is at the upper end (FIGS. 2-4) of the slots 28. When the sleeve 26 is moved upwards for retraction of the latch member 23 no movement is thereby imparted to the bar 18 since this movement takes place under equalization of the lost motion of the slots 28 while the pin 20 remains stationary. On the other hand, when the sleeve 26 is moved downwards (FIG. 5) the bar 18 is taken along so that the strap-receiving portions 18d and 18h are moved away from their abutments but this has no effect on the latch member 23 which remains in its latching position while the angularly bent portion 27 moves away from said latch member.

The function of the safety belt thus described with regard to the adjustment of the strap lengths is as follows.

When the seat occupant fastens the belt he grasps the buckle body 16 with one hand thereby encircling the sleeve 26 and pulls the buckle body towards the locking tongue 15. Should any of the straps 10 and 12 be too short, it will be lengthened during the movement of the buckle body towards the locking tongue inasmuch as the sleeve 26 at the stretching of the strap is moved downwards as viewed in FIGS. 2-5 relative to the buckle body so that the strap-receiving portions 18d and 18h are moved away from their respective abutments 17d and 17h (cf. FIG. 5) and the strap or straps being of too short a length are allowed to slide through the buckle body 16 while the clasps 22d and 22h, respectively, is moved along the strap. The buckle body is passed on to the locking tongue 15 (FIG. 3), the latch member being retracted without being hindered by the sleeve 26 until the shoulder 24 engages the edge surface 25, the latch member 23 snapping into the latching position under the pressure of the spring 19 (FIG. 4). If the sleeve 26 is then released and left to its own devices, it is moved by the pressure spring 19 over the bar 18 and the pin 20 (which engages in the upper ends of the slots 28) back to normal position. The straps 10 and 12 will now be clamped in the buckle body 16 between their respective strap-receiving portions 18d, 18h and the abutments 17d, 17h. Should any of the straps be too long it is easily adjusted to the correct length, the bar being urged away from the abutments by moving the sleeve 26 downwards as viewed in FIG. 5 and by effecting a pull at the associated clasps 22d and 22h, respectively, while moving it along the strap. The engagement between the buckle body and the locking tongue is not disturbed thereby. In so shortening either strap it is not absolutely necessary to actuate the sleeve 26 since a pull at the associated clasps 22d and 22h, respectively, entails a straightening of the strap portion between the strap-receiving portion and the abutment so that the bar is moved away from the abutment and the strap is able freely to slide through the buckle body.

If the seat occupant on driving wants to incline forwardly for instance in order to reach the glove compartment he pushes the sleeve 26 towards the lower end into the position according to FIG. 5 and can now incline forwardly while the chest strap 10 runs through the buckle body. At this forward inclination the seat occupant still has the favour of being protected by means of the hip strap 12, should a collision occur, since the inertia force of the seat occupant overcomes the adjusting force on the bar and produces a momentary fixation of the hip strap at the moment of collision. After the seat occupant has again reclined against the seat back, the length of the chest strap 10 is adjusted in that the clasp 22d is moved away from the buckle 14 along the chest strap. If the seat occupant wants to adjust the position of the seat longitudinally of the vehicle, he can easily adapt the strap lengths by lengthening or shortening the straps in the manner outlined above.

Since the buckle 14 in position of use is substantially upright the fastening of the safety belt and the release of the straps in the buckle body to permit lengthening thereof takes place by a downwardly directed movement, and the unfastening of the safety belt by an upwardly directed movement. Any adjustment of the safety belt takes place within an area biodynamically favourable to the seat occupant, namely approximately at hip level, and all desired manoeuvers may be effected with one and the same hand without it being necessary for the seat occupant to move his eyes from the road or, for the driver, to let go of the steering wheel with both hands. In other words, the operation takes place in a psychologically or instinctively correct manner.

The strap ends passed through the buckle may be attached in a spring operated seat belt retracting mechanism at or close to the anchorage point 11 and 13, respectively, instead of being connected to the clasps 22d and 22h. This retracting mechanism will then automatically by spring action shorten a strap of too long a length as soon as the seat occupant by means of the sleeve 26 releases the strap in the buckle body 16, and will permit drawing out the strap against spring action when a lengthening of the strap is required. It should be observed that this retracting mechanism is not put under load when the strap is exposed to pull, since said pull is taken up by the strap part located between the buckle and the associated anchorage point.

An important advantage of the described safety belt is that it is possible to use in the belt different types of materials for the chest and hip straps. For it is well-known that the thorax which is a relatively weak part of the body should be braked by means of a strap having a relatively large remaining elongation at a collision. The hip portion which across the pelvis is a considerably more rigid part of the body is able to take up very large retardation forces. For this reason and since the upper body in most cases may be allowed a greater freedom of motion in the vehicle than the hip portion, the chest strap and the hip strap should be given different properties. In a safety belt where the chest and hip straps as a continous loop can slide through the buckle, such a differentiation of the properties of the straps is not easily provided, but in the safety belt described, this brings no difficulties whatever thanks to the individual straps and the individual fastening of the straps.

It may be suitable to arrange the straps detachable at the anchorage points 11 and 13 so that either strap can be made entirely inoperative or to be connected to the same anchorage point as the other strap. In such a case the safety belt can be used either as a three-point safety belt according to FIG. 1 or, alternatively, as a double or single chest belt or as a double or single hip belt.

The straps ends passed through the buckle 14 can be made as a continuous piece with or without clasps so as to form a loop (indicated by a broken line 29 in FIG. 1) between the chest strap and the hip strap without it being necessary to change the fastening of the strap in the buckle. In return the adjustment of the strap lengths will be simpler insofar as the seat occupant by grasping said loop in one hand can readily shorten either the chest strap or the hip strap or both while simultaneously exerting a pull and turning of the hand. However, both straps are individually locked so that there is no risk of "submarining." A simplified embodiment of this modification is shown in FIG. 6 in which the chest strap 10 and the hip strap 12 are connected to a locking tongue 30 which is adapted to be engaged in a buckle body which is connected directly or by means of a strap to the floor of the vehicle body.

An oval bar 31, preferably with a smooth surface, is nonrotatably guided in slots in a pair of lugs 32 bent away from the locking tongue 30 to be able to move towards and away from a cylindrical abutment 33 preferably having a knurled surface and being non-rotatably attached between the lugs 32, the straps 10 and 12 being passed about the bar 31 from the side of said bar which is opposed to the web between the lugs and being drawn out between the bar and the abutment to form a loop (29 in FIG. 1) of which but the parts 29a and 29b closest to the locking tongue are shown in FIG. 6. If a pull is effected in either of the straps 10 and 12, for example at a collision or abrupt braking, the continuous strap length formed by these straps is clamped between the bar and the abutment. To permit drawing out either the strap 10 or the strap 12 from the locking tongue 30 under simultaneous shortening of the loop 29 for increasing the effective length of the chest strap and the hip strap, respectively, the bar 31 is provided on the outer side of the lugs 32 with finger grips 34 to permit grasping the bar at the grips with the fingers and positively moving it away from the abutment 33 under cancellation of the clamping action between the bar and the abutment. A decrease of the effective length of the chest strap or the hip strap is brought about by a pull at the loop portion 29a and the loop portion 29b, respectively, and if it is desired to shorten both the chest strap and the hip strap, a pull is effected at both loop portions 29a and 29b at a time. This can be facilitated by having the loop 29 extending through a fitting 35 (FIG. 1) which is shaped for easy grasp with the fingers and which may be a closed rectangular frame of metal or synthetic plastic material. At the fastening of the safety belt it usually sufficies to pull at said fitting inasmuch as both the chest strap and the hip strap will thereby be shortened in effective length, until one of them lies stretched across the seat occupant, whereupon the effective length of the other strap is reduced by a pull at the loop 29 which slides through the fitting 35 until also the other strap lies stretched across the seat occupant. At a decrease of the effective length of the strap by a pull at the loop 29 it is not necessary to move the bar 31 manually away from the abutment 33, as this occurs automatically when the loop is pulled by the strap parts in the gap between the bar and the abutment being straightened while the bar is moved away from the abutment.

While the invention has been described in the foregoing in some embodiments thereof with reference to the accompanying drawings, it is readily seen that modifications are possible without departing from the scope of the appended claims. As mentioned in the introduction, the invention is applicable to other types of three-point safety belts as well.

What I claim and desire to secure by Letters Patent is:

1. A safety belt comprising a chest strap having one end anchored at shoulder level on one side of a seat, a hip strap having one end anchored on said one side of and beneath the seat, a buckle with two connectible parts for detachable connection of said straps with an anchorage point on the other side of the seat, said straps running separately into one of said buckle parts, a manually grippable pull member on each strap forming an extension thereof and emerging from said one buckle part, clamping means for immovably engaging each of said chest and hip straps with said one buckle part, said clamping means comprising a stationary abutment and a bar movable transversely to and from said abutment and encircled by a loop formed by the strap and the pull member thereof, said strap passing onto the bar substantially on the side thereof opposite to said abutment with the pulling member forming an extension of the strap, extending from the bar between the bar and the abutment to be clamped between the bar and the abutment by the exertion of pull at the strap, and manually operable means for moving said bar from the stationary abutment to allow the loop encirculing the bar to move through said one buckle part in order to increase the effective length of the strap by the exertion of pull at the strap, said bar also being movable from said abutment by the exertion of pull at said pull member to allow the loop encircling the bar to move through said one buckle part by exertion of pull on said pull member in order to decrease the effective length of the strap.

2. A safety belt in accordance with claim 1 comprising for each pull member a clasp connected to the end of the pull member remote from said one buckle part, said clasp being movably guided on the strap associated with said pull member.

3. A safety belt in accordance with claim 1 wherein the pull members at their ends remote from said one buckle part are integral to form a continuous loop.

4. A safety belt in accordance with claim 1 further comprising in said one buckle part at one end thereof a locking mechanism adapted to engage the other buckle part at the anchorage point on said other side of the seat, said clamping means being arranged at the opposite end of said one buckle part, and means operatively connecting said manually operable means with said locking mechanism, said manually operable means being movable towards said one end for moving the bar away from the abutment and towards the opposite end of said one buckle part to cause the locking mechanism to be disengaged from said other buckle part.

5. A safety belt in accordance with claim 4 further comprising means providing lost motion between said bar and said manually operable means to permit movement of the manually operable means towards said opposite end without being impeded by the bar or actuating it.

6. A safety belt in accordance with claim 1 wherein the two straps are passed each around one bar.

7. A safety belt in accordance with claim 6 wherein said bars form together a unitary element.

8. A safety belt in accordance with claim 1 comprising spring means biasing said bar against said stationary abutment.

9. A safety belt in accordance with claim 8 wherein said locking mechanism comprises a movable latch member having a locking position and preventing in such position said other buckle part from disengaging said one buckle part when engaged therewith, said spring means comprising a pressure spring interposed between the bar and said latch member of said locking mechanism to hold the latch member in said position, said latch member being movable by said manually movable means from said position against the action of said spring.

10. A safety belt in accordance with claim 9 wherein said means providing lost motion between the bar and the manually operable means is of the pin and slot type, and said manually operable means comprises a projection to take along said latch member in its movement when displaced towards said opposite end of said one buckle part under lost motion in said means providing lost motion.

11. A safety belt in accordance with claim 10 wherein said manually operable means comprises a sleeve surrounding said one buckle part.

References Cited by the Examiner

UNITED STATES PATENTS

| | | | |
|---|---|---|---|
| 2,710,649 | 6/1955 | Griswold et al. | 297—389 |
| 2,775,288 | 12/1956 | Anastasia | 280—150 |
| 3,172,701 | 3/1965 | Wemen | 497—389 |
| 3,177,547 | 4/1965 | Wisniewski | 24—230.1 |
| 3,258,293 | 6/1966 | Sharp | 297—389 |

FOREIGN PATENTS

| | | |
|---|---|---|
| 1,232,865 | 4/1960 | France. |
| 1,277,656 | 8/1961 | France. |

DAVID J. WILLIAMOWSKY, *Primary Examiner.*

JAMES T. McCALL, *Examiner.*